US008608020B2

(12) United States Patent
Fehse et al.

(10) Patent No.: US 8,608,020 B2
(45) Date of Patent: Dec. 17, 2013

(54) HANDLE FIXTURE

(75) Inventors: Hans-Friedrich Fehse, Deggingen (DE); Stephan Grabbe, Donzdorf-Winzingen (DE); Martin Geiger, Kuchen (DE); Ragnar Jehle, Ludwigsburg (DE); Peter Kneer, Kuchen (DE); Maria Mormone, Kuchen (DE); Peter Ramminger, Aufhausen (DE); Dieter Reinhard, Deggingen (DE); Heinz Schmidt, Lonsee (DE); Peter Tatzelt, Amstetten (DE); Friedhelm Uglorz, Steinheim (DE)

(73) Assignee: WMF Wurttembergische Metallwarenfabrik AG (DE)

( * ) Notice: Subject to any disclaimer, the term of this patent is extended or adjusted under 35 U.S.C. 154(b) by 225 days.

(21) Appl. No.: 12/741,988

(22) PCT Filed: Jul. 15, 2009

(86) PCT No.: PCT/EP2009/059020
§ 371 (c)(1),
(2), (4) Date: Oct. 15, 2010

(87) PCT Pub. No.: WO2010/015492
PCT Pub. Date: Feb. 11, 2010

(65) Prior Publication Data
US 2011/0024437 A1 Feb. 3, 2011

(30) Foreign Application Priority Data
Aug. 6, 2008 (DE) .......................... 10 2008 036 551

(51) Int. Cl.
*B65D 25/28* (2006.01)

(52) U.S. Cl.
USPC ............................................ 220/759; 220/760

(58) Field of Classification Search
CPC ................................. B65D 25/28; B65D 25/10
USPC .............................. 220/759, 760; 16/441, 444
See application file for complete search history.

(56) References Cited

U.S. PATENT DOCUMENTS

| 3,648,887 A * | 3/1972 | Hartley | 220/759 |
| 5,221,170 A * | 6/1993 | Duffy et al. | 411/428 |
| 5,509,173 A * | 4/1996 | LaSaosa | 220/759 |
| 6,260,733 B1 * | 7/2001 | Eimerman | 220/759 |

(Continued)

FOREIGN PATENT DOCUMENTS

| DE | 2357431 A1 | 5/1975 |
| DE | 2528149 A1 | 1/1977 |

(Continued)

OTHER PUBLICATIONS

English translation of Japanese office action issued Jun. 18, 2013.

(Continued)

*Primary Examiner* — Stephen Castellano
(74) *Attorney, Agent, or Firm* — Rader, Fishman & Grauer PLLC

(57) ABSTRACT

A handle fixture device, comprising, a cooking vessel; a retaining element attached to the cooking vessel; and a contact is provided between the retaining element on one side and a handle-side retaining device on the other side, wherein the contact is at least one of point shaped and line shaped.

12 Claims, 5 Drawing Sheets

(56) References Cited

U.S. PATENT DOCUMENTS

| | | | |
|---|---|---|---|
| 6,415,478 B1 * | 7/2002 | Watanabe et al. | 16/444 |
| 6,962,265 B1 * | 11/2005 | Zhang | 220/759 |
| 2007/0228056 A1 * | 10/2007 | Hoff et al. | 220/759 |

FOREIGN PATENT DOCUMENTS

| | | | |
|---|---|---|---|
| DE | 3407503 A1 | 9/1985 |
| DE | 9405597 U1 | 5/1994 |
| DE | 9414233 U1 | 11/1994 |
| DE | 9414234 U1 | 11/1994 |
| DE | 4411550 C1 | 6/1995 |
| DE | 10322409 A1 | 12/2004 |
| DE | 102006058041 A1 | 6/2008 |
| EP | 0070205 A1 | 1/1983 |
| EP | 0508972 A1 | 10/1992 |
| EP | 0775461 A1 | 5/1997 |
| EP | 2036474 A1 | 3/2009 |
| JP | 2002-028093 A | 1/2002 |
| JP | 2003-210340 A | 7/2003 |

OTHER PUBLICATIONS

English abstract for JP2002-28093.

English abstract for JP2003-210340.

* cited by examiner

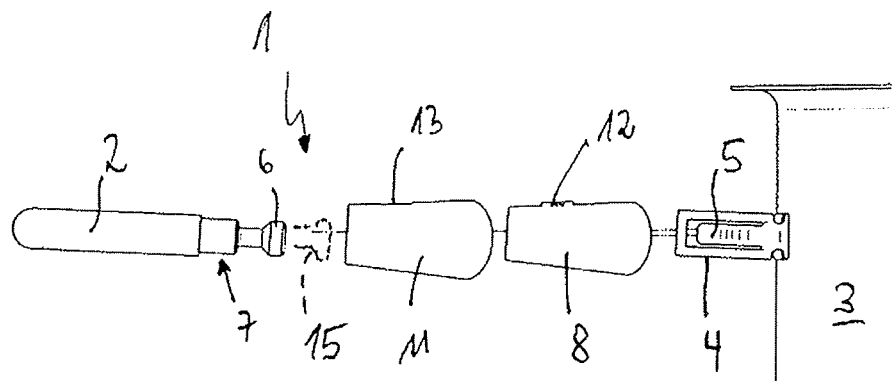
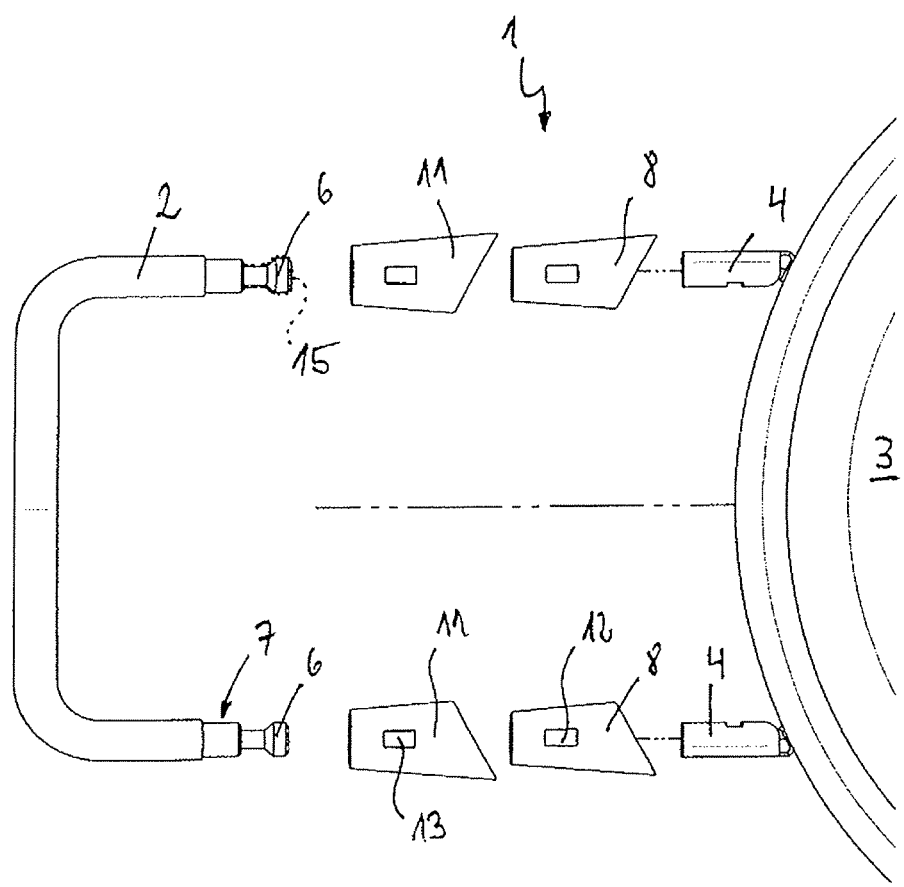
Fig. 2

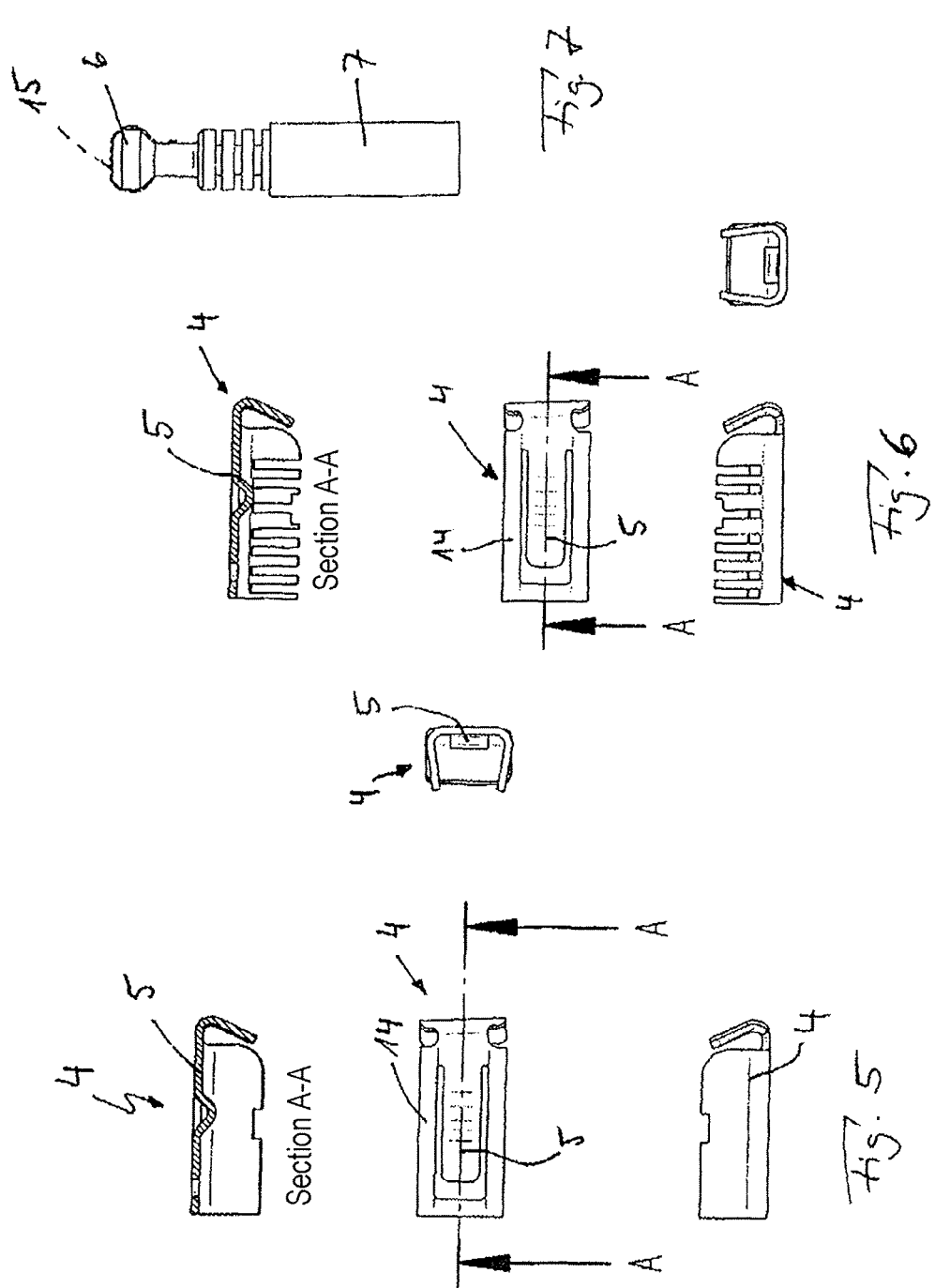

HANDLE FIXTURE

CROSS-REFERENCES TO RELATED APPLICATION

This application is a National Stage application which claims the benefit of International Application No. PCT/EP2009/059020 filed Jul. 15, 2009, which claims priority based on German Patent Application No. DE 10 2008 036 551.3, filed Aug. 6, 2008, both of which are hereby incorporated by reference in their entirety.

TECHNICAL FIELD

The present invention relates to a handle fixture device for attaching a handle to a cooking vessel or the like, according to the preamble of claim 1. The invention also relates to a cooking vessel fitted with such a fixture device.

BACKGROUND

DE 94 14 233 U1 discloses a generic handle fixture for latching a handle piece into its application bearings on a cooking vessel or the like. The described handle fixture device should be configured in particular in such a manner that unintended unlatching of the handle piece and connected with this an unintentional separation of the handle piece from the cooking vessel can be prevented. In order to effect this, the known handle fixture has two latching connections which work independently from each other between the cooking vessel on one side and the handle on the other side.

DE 94 05 597 U1 discloses another device for fixing a handle to a cooking vessel. The handle fixture allows the fixing of a stick-type handle which is formed as a hollow metallic handle, by means of which handling of the cooking vessel fitted with it should be simplified owing to the reduced weight.

Other handle fixtures are known for example from DE 34 07 503 C2, DE 103 22 409 A1, DE 94 14 234 U1 and DE 44 11 550 C1.

However, all the handle fixtures known from the prior art have in common that they have, in the case of a metallic cooking vessel and a metallic handle, a high level of heat transfer between the cooking vessel and the handle when the cooking vessel is used, which usually leads to it being impossible for the cooking vessel to be grasped by the handle without additional protective measures after a certain time. As however metallic cooking vessels are still popular among consumers, various attempts have been made, for example not forming the handles from metal, in order to be able to design the latter in such a manner that grasping the handle is still safely possible even after a relatively long cooking time.

SUMMARY

The present invention concerns itself with the problem of specifying for a handle fixture of the generic type an improved or at least a different configuration, which easily allows safe handling even with a greatly heated cooking vessel.

This problem is solved according to the invention by the subject matter of the independent claims. Advantageous embodiments form the subject matter of the dependent claims.

The invention is based on the general idea of attaching a handle of a cooking vessel exclusively by means of a point- or line-shaped contact to the cooking vessel and thus minimising thermal bridges or heat transfer between the cooking vessel and the actual handle. To this end, the invention proposes a handle fixture for fixing a handle to a cooking vessel or the like, which comprises a retaining element which is attached to the cooking vessel, preferably in a non-detachable manner. According to the invention, only a line- or point-shaped contact, not a planar contact, should be present between this retaining element and a retaining device on the handle side, for example a retaining pin with a retaining head. The retaining element can according to the invention have a resilient latching element which, when the handle is attached to the cooking vessel, engages behind a handle-side retaining head of the retaining device, which is formed for example as a retaining pin and thus fixes the handle to the cooking vessel. Furthermore, an adapter element can be provided which grasps the retaining element and has a through-opening for the handle-side retaining head and covers the actual handle fixture when the handle is attached to the cooking vessel. In the above-described embodiment, there is only a point- or line-shaped contact between the retaining element on one side and the handle-side retaining head on the other side, that is, between the cooking vessel and the handle, so that heat transfer between the cooking vessel and the handle is minimised and thus heating of the handle during the actual cooking process can be greatly reduced. By means of the handle fixture according to the invention, it is possible to attach metallic handles to likewise metallic cooking vessels without it being likely during a relatively long cooking time that the handle or handles are heated to such an extent that they can no longer be safely grasped. The possibility arises thereby of using the metallic handles which are still very popular among consumers without the risk to the consumer of being burnt on the metallic handle arising at any time during a normal cooking process.

In an advantageous development of the solution according to the invention, the adapter element is formed from plastic, in particular from silicone. This provides on the one hand the possibility of forming the adapter element in an extremely cost-effective manner and on the other hand the possibility of adapting the adapter element quickly and cost-effectively, that is, by means of a changing injection-moulding tool, when the handle fixture changes. Furthermore, the properties of plastics can these days be adapted to virtually any demand so that in this respect an adapter element formed from plastic offers a clear advantage.

In a further advantageous embodiment of the solution according to the invention, a screen element, consisting in particular of metal, which covers the adapter element is provided. Such a screen element, which can be formed for example as a type of sleeve, thus covers the adapter element which is formed from plastic and thereby provides a metallic design which is visually continuous from the cooking vessel to the handle. Of course, the screen element can have specific visual or design effects which either underline and thus emphasise or hide the transition from the cooking vessel to the handle.

In an advantageous development of the solution according to the invention, the retaining element is arranged on the cooking vessel by means of at least one, preferably by means of two welded points. In this case too, an exclusively point-shaped contact between the retaining element on one side and the cooking vessel on the other side is selected in order to be able to keep the heat transfer from the cooking vessel to the retaining element and thus from the cooking vessel to the handle as low as possible. Such point welded connections are currently a widespread method of fixing and are on one hand inexpensive to produce and on the other hand so stable that they allow reliable fixing of the handle to the cooking vessel during its entire service life.

Further important features and advantages of the invention can be found in the subclaims, the drawings and the associated description of the figures using the drawings.

It is self-evident that the features which are mentioned above and those which are still to be explained below can be used not only in the combination specified in each case, but also in other combinations or alone without departing from the framework of the present invention.

BRIEF DESCRIPTION OF THE DRAWING

Preferred exemplary embodiments of the invention are shown in the drawings and are explained in more detail in the following description, with the same reference symbols referring to the same or similar or functionally identical components.

In the figures.

DETAILED DESCRIPTION

Figure 1:
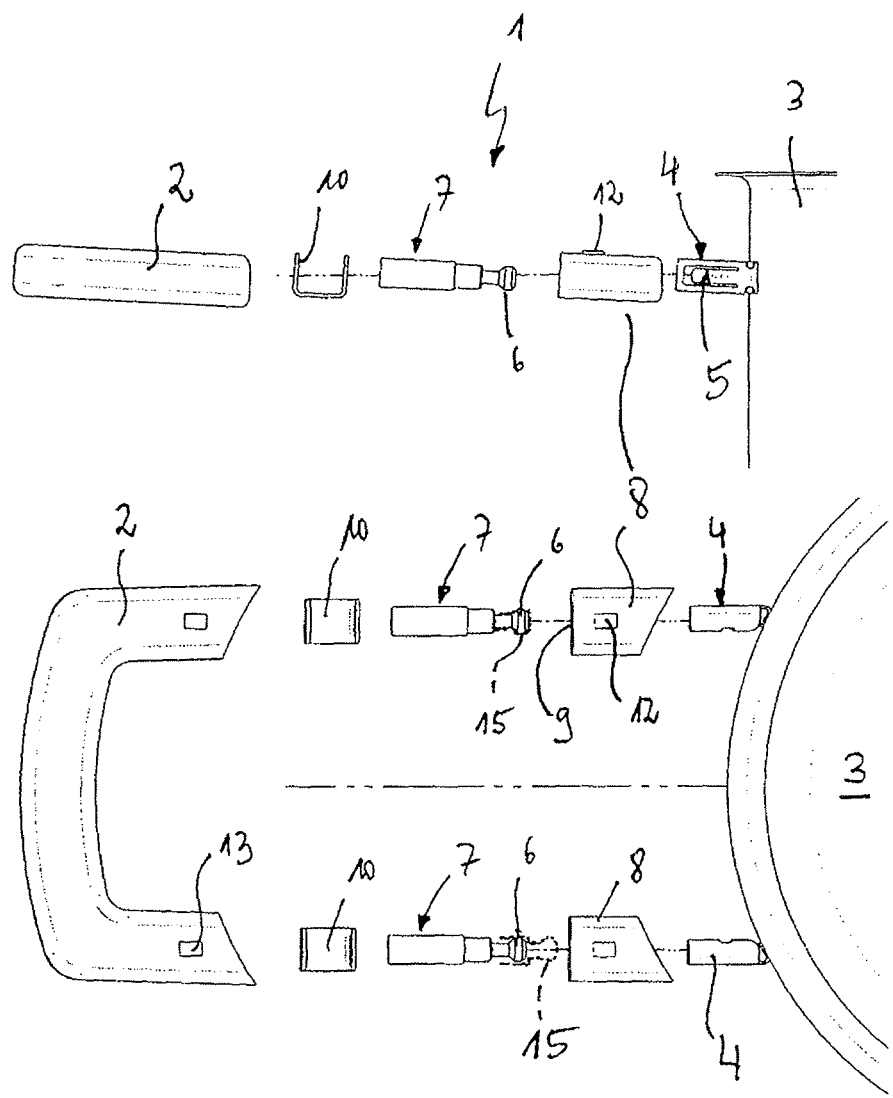
FIG. 1 schematically shows an exploded diagram of a handle fixture according to the invention in different views, FIG. 2 schematically shows a diagram as in FIG. 1, but with a different handle fixture and a different handle, FIG. 3 schematically shows different sectional diagrams of a handle fixture according to FIG. 1, FIG. 4 schematically shows different sectional diagrams with a handle fixture according to FIG. 2, FIG. 5 schematically shows a first embodiment of a retaining element according to the invention, FIG. 6 schematically shows a diagram as in FIG. 5, but in a different embodiment, FIG. 7 schematically shows a possible embodiment of a retaining device.
Figure 3:
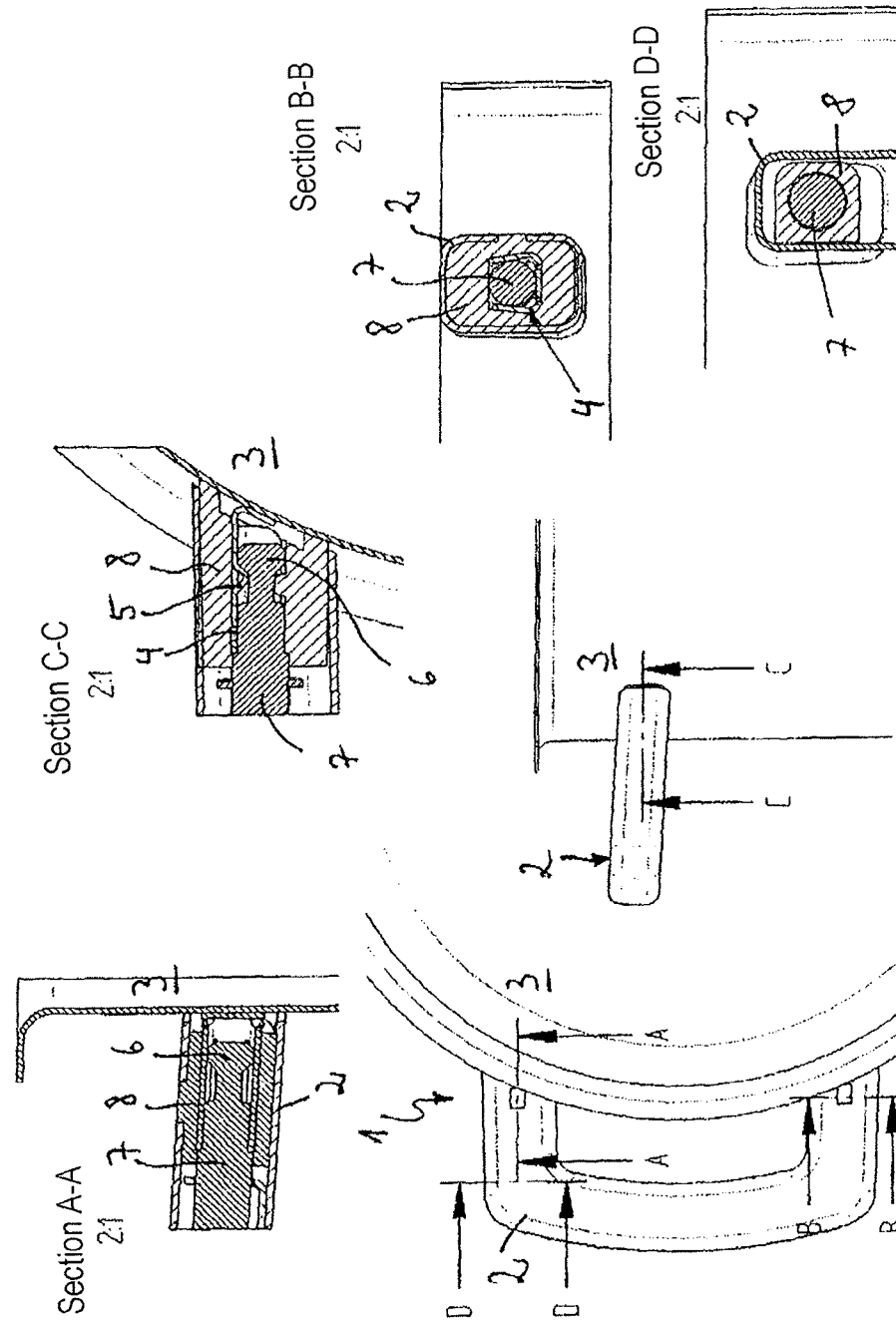
Figure 4:
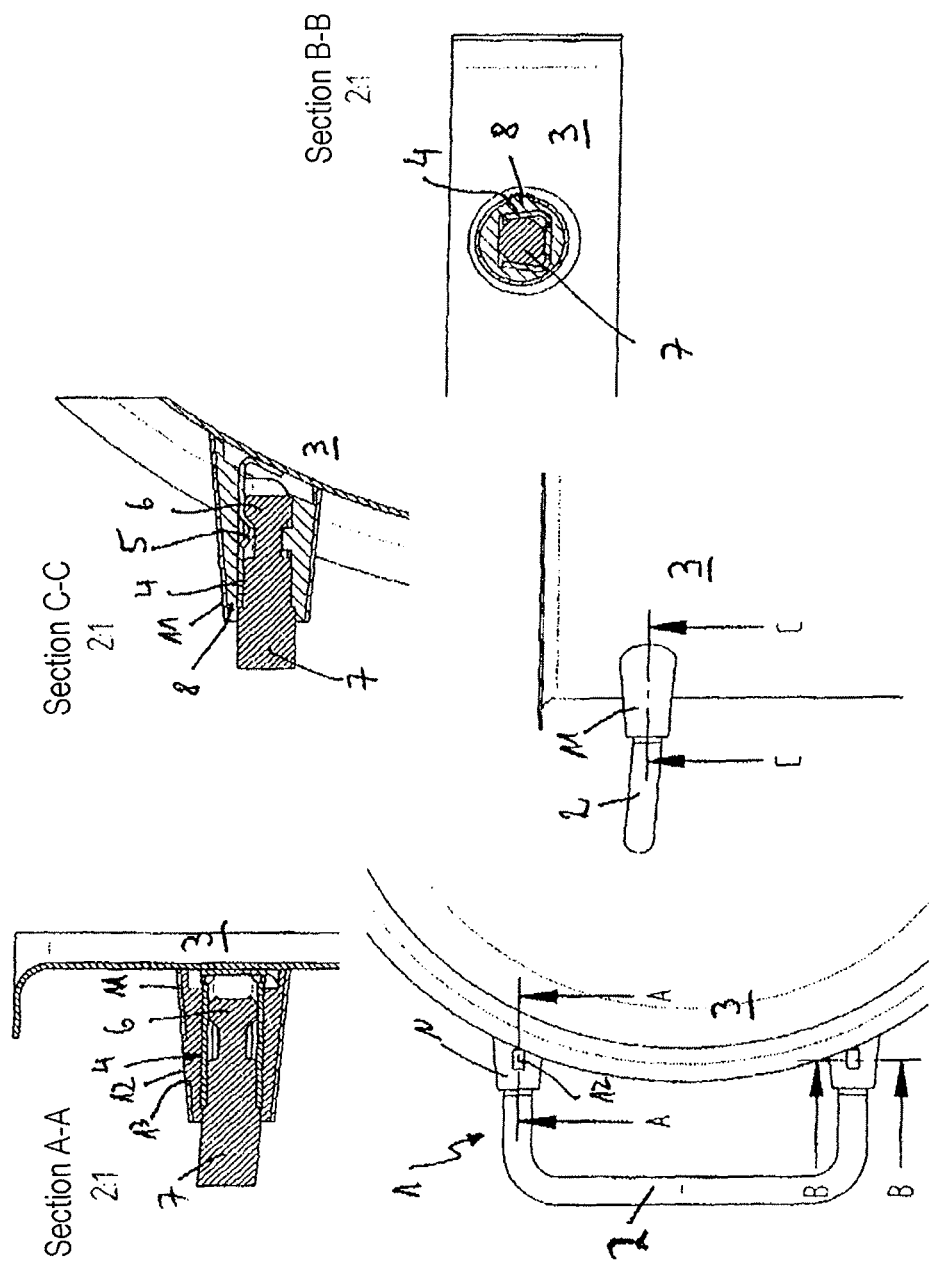

According to FIG. 1, a handle fixture device 1 according to the invention for fixing a handle 2 to a cooking vessel 3 has a retaining element 4 which is attached, in particular welded, to the cooking vessel 3, preferably in a non-detachable manner. A resilient latching element 5 is provided on the retaining element 4, which latching element, when the handle 2 is completely attached to the cooking vessel 3, engages behind a handle-side retaining head 6 of a retaining device 7, which is for example formed as a retaining pin (see also the sectional diagrams in FIGS. 3 and 4). Furthermore, an adapter element 8 is provided which grasps, that is, accommodates the retaining element 4 and has a through-opening 9 for the handle-side retaining head 6. The retaining head 6 or the retaining device 7 can be formed either in one piece with the handle 2 (see FIG. 2) or separately from the latter and be fixed in the handle 2 by means of a clamping element 10, in particular a clamp (see FIG. 1). A welded connection between the retaining device 7, the clamping element 10 and the handle 2 is also conceivable. It is essential to the invention that only a point- or line-shaped contact is present between the retaining element 4 on one side and the handle-side retaining device 7, in particular the retaining head 6 on the other side, as a result of which heat transfer from the cooking vessel 3 to the handle 2 can be minimised. It is in particular also possible thereby to form the handle 2 from metal without it being likely that, during a relatively long cooking process, it is heated to such an extent that it can no longer be safely grasped. The handle 2 is thus thermally decoupled from the cooking vessel 3.

The handle fixture 1 can have a screen element 11 which covers the adapter element 8 and can likewise be formed preferably from metal. Such a screen element 11 is for example shown in FIG. 2. Fixing between the adapter element 8 on one side and the screen element 11 on the other side can for example be effected by means of a latching lug 12 which is arranged on the adapter element 8 and, when the handle 2 is attached to the cooking vessel 3, interacts with a complementarily formed latching opening 13 on the handle 2 or on the screen element 11. In the handle fixture 1 according to FIG. 1, the task of the screen element 11 is undertaken by the handle 2 itself, which is formed as a hollow profile and can be pushed over the adapter element 8 at least until the latching lug 12 on the adapter element side latches into the latching opening 13 on the handle side. The fact that the handle 2 according to FIG. 2 is not hollow means that the latter is not able to grasp the adapter element 8, so that a screen element 11 is provided in this case. This screen element 11 can in principle be configured in such a manner that it underlines, that is, emphasises, or hides a transition between the cooking vessel 3 and the handle 2.

The retaining element 4 is attached to the cooking vessel 3 by means of at least one, preferably two welded points, as a result of which only a point-shaped contact exists between the retaining element 4 on one side and the cooking vessel 3 on the other side. In order to fix the handle 2 to the cooking vessel 3, first the adapter element 8 is pushed over the retaining element 4 and then the handle 2 with its retaining devices/pins 7 is pushed through the through-opening 9 of the adapter element 8 until it latches with the latching element 5 of the retaining element 4. A screen element 11 can also be provided depending on the embodiment of the handle 2. The latching of the latching element 5 with the retaining head 6 of the retaining device 7 can be seen clearly in particular in the sectional diagrams C-C of FIGS. 3 and 4.

In order to attach the handle 2 as stably as possible to the cooking vessel 3, it is provided for the adapter element 8 and/or the screen element 11, or in the other embodiment the handle 2 itself, to be supported on the cooking vessel 3 and bear in a form-fitting manner against it.

If one considers in particular FIGS. 5 and 6, it can be seen that the retaining element 4 has a U-shaped cross section, wherein the latching element 5 which engages behind the retaining head 6 of the retaining pin 7 is arranged on a web 14 which connects the two sides of the U. The retaining element 4 can however also have any other hollow shape. The retaining element 4 can generally be formed as a cost-effective sheet metal part which can be produced by simple and cost-effective punching and forming processes. In contrast, the adapter element 8 is preferably formed from plastic, in particular from silicone, and therefore can be produced in virtually any shape and with virtually any properties.

In order to be able to minimise heat transfer between the cooking vessel 3 and the handle 2 further, it can be provided for the retaining element 4 to have comb-shaped sides of the U, as is shown by way of example in FIG. 6. A contact area between the retaining element 4 and the retaining device 7 can be further reduced by these discontinuous sides of the U, which results in turn in a reduced heat transfer rate. The retaining pin 7 can also be configured in a similar manner (see FIG. 7) and have an outer circumference which is discontinuous in the axial direction. The objective of the handle fixture device 1 according to the invention is to reduce the contact areas between the handle 2 and the cooking vessel 3 to such an extent that the handle 2 does not heat up so much that safe grasping is no longer possible, even after relatively long cooking processes.

In order to be able to reduce heat transfer between the retaining element 4 and the retaining device 7 on the handle side further, an insulating element 15 or a coating which insulates the retaining device 7 from the retaining element 4 can optionally be provided here. The insulating element 15 or the thermally insulating coating are shown according to FIG. 1 with dashed lines.

The handle fixture device 1 according to the invention can generally also be part of a modular assembly system which is not described in any more detail but comprises different adapter elements 8, different retaining elements 4, different retaining devices 7 etc. and can thereby be adapted easily to different handles 2 or different cooking vessels 3. It is generally possible with the handle fixture device 1 according to the invention to develop the metallic handle elements which are currently particularly popular with consumers in such a manner that they undergo considerably reduced heating during use of the cooking vessel 3 compared to known metallic handle elements.

The invention claimed is:

1. A handle fixture device, comprising:
   a cooking vessel;
   a retaining element attached to the cooking vessel; and
   a contact provided between the retaining element on one side and a handle-side retaining device on the other side, wherein the contact is point shaped;
   an adapter element, wherein the adapter element grasps the retaining element and has a through-opening for a retaining head;
   wherein the retaining element is generally straight;
   wherein the generally straight retaining element has a generally U-shaped cross-section with two sides;
   wherein the retaining element has a resilient latching element; and
   wherein the resilient latching element is arranged on a web that connects the two sides of the U-shaped cross-section.

2. The handle fixture device according to claim 1, wherein the retaining element is hollow.

3. The handle fixture device according to claim 1, wherein the adapter element is formed from plastic.

4. The handle fixture device according to claim 1, wherein the adapter element is formed from a silicone.

5. The handle fixture device according to claim 1, further comprising a screen element, wherein the screen element is metal and covers the adapter element.

6. The handle fixture device according to claim 5, wherein the adapter element has a latching lug, which interacts with a latching opening, which is formed complementarily to it on at least one of the handle and on the screen element when the handle is attached to the cooking vessel.

7. The handle fixture device according to claim 5, wherein at least one of the adapter element and the screen element are supported on the cooking vessel.

8. The handle fixture device according to claim 1, wherein the retaining head is formed in one piece with the handle.

9. The handle fixture device according to claim 1, wherein the retaining element is attached to the cooking vessel by at least one weld.

10. The handle fixture device according to claim 1, wherein at least one of the retaining device and the retaining element is provided with an insulated coating on the surface that extends between the retaining element and the handle-side retaining device for insulating the retaining device from the retaining element.

11. A handle fixture device, comprising:
    a cooking vessel;
    a retaining element attached to the cooking vessel; and
    a contact provided between the retaining element on one side and a handle-side retaining device on the other side, wherein the contact is point shaped;
    wherein the retaining element is generally straight;
    wherein the generally straight retaining element has a generally U-shaped cross-section with two sides;
    wherein the retaining element has a resilient latching element;
    wherein the resilient latching element is arranged on a web that connects the two sides of the U-shaped cross-section; and
    wherein the generally U-shaped cross-section is interrupted adjacent a free end of the handle-sided retaining device.

12. The handle fixture device according to claim 11, wherein an outer periphery of the free end of the handle-sided retaining device is generally uniform.

* * * * *